United States Patent
Agrawal et al.

(10) Patent No.: US 11,822,454 B2
(45) Date of Patent: Nov. 21, 2023

(54) MITIGATING SLOW INSTANCES IN LARGE-SCALE STREAMING PIPELINES

(71) Applicant: Microsoft Technology Licensing, LLC, Redmond, WA (US)

(72) Inventors: Ashvin Agrawal, Cupertino, CA (US); Avrilia Floratou, Mountain View, CA (US); Ke Wang, Pittsburgh, PA (US); Daniel E. Musgrave, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/822,212

(22) Filed: Aug. 25, 2022

(65) Prior Publication Data

US 2022/0405186 A1    Dec. 22, 2022

Related U.S. Application Data

(63) Continuation of application No. 16/670,287, filed on Oct. 31, 2019, now Pat. No. 11,461,213.

(51) Int. Cl.
| | |
|---|---|
| *G06F 11/00* | (2006.01) |
| *G06F 11/34* | (2006.01) |
| *G06F 9/50* | (2006.01) |
| *H04L 69/00* | (2022.01) |
| *H04L 47/125* | (2022.01) |

(52) U.S. Cl.
CPC ........ *G06F 11/3433* (2013.01); *G06F 9/5083* (2013.01); *H04L 69/00* (2013.01); *G06F 11/3423* (2013.01); *G06F 11/3471* (2013.01); *H04L 47/125* (2013.01)

(58) Field of Classification Search
CPC .................................................. G06F 11/3433
See application file for complete search history.

(56) References Cited

U.S. PATENT DOCUMENTS

| | | | | |
|---|---|---|---|---|
| 7,787,370 | B1 * | 8/2010 | Aweya | H04L 45/245 370/252 |
| 8,316,352 | B2 * | 11/2012 | Lev | G06F 11/362 717/124 |
| 8,856,913 | B2 * | 10/2014 | Cline | H04L 63/168 726/13 |
| 9,240,906 | B2 * | 1/2016 | Edwards | H04L 12/66 |
| 9,806,972 | B2 * | 10/2017 | Edwards | H04L 12/66 |

(Continued)

*Primary Examiner* — Amine Riad
(74) *Attorney, Agent, or Firm* — Weaver IP L.L.C.

(57) ABSTRACT

A system is described herein for mitigating slow process instances in a streaming application. The system includes a slow process instance candidate identifier configured to identify, based on a relative watermark latency, a set of slow process instance candidates from among a plurality of process instances that comprise the streaming application. The system further includes a set of filters configured to remove false positives from the set of slow process instance candidates. The filters account for window operations performed by the process instances as well as stabilization time needed for downstream process instances to stabilize after a slow upstream process instance is mitigated by a mitigation implementer, which may also be included in the system.

20 Claims, 7 Drawing Sheets

(56) References Cited

U.S. PATENT DOCUMENTS

| | | | | |
|---|---|---|---|---|
| 2002/0120727 A1* | 8/2002 | Curley | ............... | H04L 43/0852 |
| | | | | 709/224 |
| 2005/0091654 A1* | 4/2005 | Lection | ................ | G06F 9/5005 |
| | | | | 718/100 |
| 2009/0037592 A1* | 2/2009 | Lyon | .................... | H04L 65/104 |
| | | | | 709/228 |
| 2014/0215077 A1* | 7/2014 | Soudan | .................. | H04L 47/11 |
| | | | | 709/226 |
| 2019/0036788 A1* | 1/2019 | Gupta | .................. | H04L 41/147 |

\* cited by examiner

MITIGATING SLOW INSTANCES IN LARGE-SCALE STREAMING PIPELINES

CROSS-REFERENCE TO RELATED APPLICATION

This application is a continuation of and claims priority to pending U.S. patent application Ser. No. 16/670,287 entitled "MITIGATING SLOW INSTANCES IN LARGE-SCALE STREAMING PIPELINES," which was filed on Oct. 31, 2019, and is herein incorporated by reference in its entirety.

BACKGROUND

One of the most critical operations for an enterprise is the efficient flow of data from one location to another. A data pipeline may help such operation with an automated process that includes a set of actions, for example, extracting, transforming, combining, validating, and loading data for further analysis and visualization. A streaming pipeline is a system for moving data from one location or system to another in real time instead of batches. Thus, streaming data may be processed in a continuous flow.

A large, complex, and critical streaming pipeline may run continuously at a scale of 3500 YARN (Yet Another Resource Negotiator) containers. There are challenges that appear when operating streaming workloads at such a large scale, particularly in shared cloud environments. Challenges include resource contention among concurrent workloads and unavailability of external dependencies can result in performance deterioration and increased job latencies. To address these challenges, dynamic control policies that detect the issues and effectively react to them when they arise may be needed. A conservative approach that is hesitant to acquire additional resources may react too slowly to the environmental changes, and therefore achieves little improvement in the tail or the 99th percentile. Conversely, an aggressive approach overwhelms the underlying resource manager with unnecessary resource requests and paradoxically worsens the 99th percentile latency.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system is described herein for identifying a set of slow process instance candidates from among a plurality of process instance candidates that comprise a streaming application. The system includes one or more processor circuits and one or more memory devices connected to the one or more processor circuits, the one or more memory devices storing computer program logic for execution by the one or more processor circuits. The computer program logic includes a watermark determiner configured to determine a first watermark of a first process instance, the first watermark representing an event time associated with a slowest input stream to the first process instance. The watermark determiner is also configured to identify a parent process instance of the first process instance, the parent process instance being included in a stage of the streaming application that precedes a stage that includes the first process instance. The watermark determiner is further configured to determine a parent watermark for the parent process instance, the parent watermark representing an event time associated with a slowest input stream to the parent process instance. The system further comprises a latency generator configured to generate a first relative watermark latency value of the first process instance with respect to the parent process instance by determining a difference between the first watermark and the parent watermark. The system also comprises a slow process instance candidate identifier configured to identify the first process instance as a slow process instance candidate if the first relative watermark latency value is higher than a second relative watermark latency value of a second process instance, the second process instance being included in the same stage of the streaming application as the first process instance.

A method is also described herein. The method comprises identifying a set of slow process instance candidates from among a plurality of process instances that comprise a streaming application. The method also includes determining whether each slow process instance candidate in the set of slow process instance candidates persists as a slow process instance candidate for a predetermined number of invocations of a mitigation policy. The slow process instance candidate is identified as a slow process instance based upon a determination that a slow process instance candidate in the set of slow process instance candidates persists as a slow process instance candidate for the predetermined number of invocations of a mitigation policy. The method further includes implementing a mitigation measure with respect to the identified slow process instance.

A system is further described herein. The system comprises one or more processor circuits and one or more memory devices connected to the one or more process circuits. The one or more memory devices storing computer program logic for execution by the one or more processor circuits. The program logic includes a slow process instance candidate identifier configured to identify a set of slow process instance candidates from among a plurality of process instances that comprise a streaming application. A filter is also included. The filter is configured to remove from the set of slow process instance candidates any slow process instance candidate that is downstream of a slow process instance for which a mitigation measure was implemented within a predetermined time. The program logic further includes a mitigation implementer configured to implement a mitigation measure with respect to the remaining slow process instance candidates in the set.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
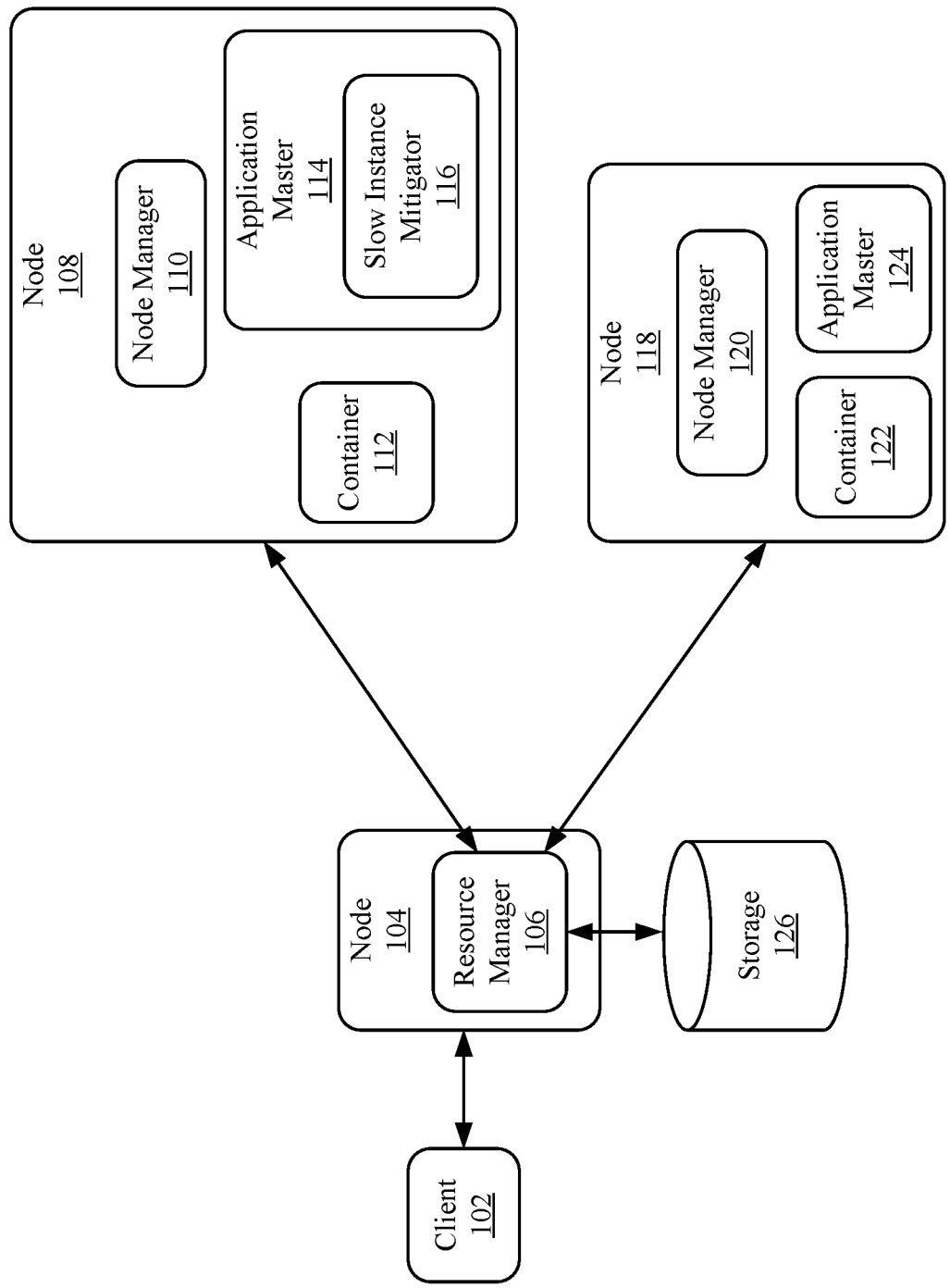
FIG. 1 is a block diagram of a streaming system, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The example embodiments described herein are provided for illustrative purposes and are not limiting. The examples described herein may be adapted to any type of business enterprise and/or operating environment. Further structural and operational embodiments, including modifications/alterations, will become apparent to persons skilled in the relevant art(s) from the teachings herein.

A data lake of an enterprise may span thousands of machines and supports various batch, streaming and interactive applications. The data lake may host some of the largest, complex and most critical workloads deployed, including large-scale streaming pipelines or streaming applications, some of which may run 24/7 and perform data processing, apply complex business logic, etc. As a result, the performance of the pipelines, defined through service level objectives (SLOs) of the latency at the tail (99th percentile), may be critical to the enterprise. In shared cloud environments in which the streaming pipelines may operate, the 99th percentile latency may be caused by resource contention due to noisy neighbors (e.g., other processes with a sudden spike in resource demand or other processes breaching their contracts by using more resources than requested), issues related to the underlying storage system (e.g., a file cannot be opened), and memory issues (e.g., issues with volatile memory used to run a streaming application). In particular, the problems that arise in the 99th percentile may manifest as slow instances in the streaming pipelines. Thus, example embodiments focus on the problem of reducing the tail latency (99th percentile) of streaming workloads that operate at a very large scale by identifying slow instances and speculatively replicating them to improve the latency.

One way to determine whether an instance is slow in both streaming and batch processing systems is to compare its performance with that of its peers (other instances belonging to the same operator). If a service level objective is latency-driven, then latency may be used as the performance metric to compare instances in a particular setting. If the latency of an instance is higher than that of its peers, then the instance is considered slow and a replica may be created. Being conservative, that is, waiting long enough to determine when an instance is slow, might result in high tail latency as a pipeline may not adjust quickly to external changes. On the other hand, an aggressive approach that makes fast decisions may result in multiple resource requests that overwhelm the resource manager when applied to a large-scale pipeline. As a result, it might paradoxically lead to worse tail latency than its conservative counterpart.

Embodiments described herein address the challenges imposed by the large-scale operation of streaming workloads in shared cloud environments. Example challenges may include concurrent workloads causing random performance deterioration, unavailability of external dependencies causing temporary stalls in a pipeline, and scarcity in the underlying resource manager causing arbitrarily long delays or rejection of container allocation requests. Embodiments described herein combine aggressive detection of slow instances with smart pruning of false positives to achieve a good trade-off between conflicting objectives of achieving little improvement in the tail latency by reacting too slowly to environmental changes and acting too aggressively with unnecessary resource requests. In example embodiments, using only 0.5 percent of additional resources (similar to the conservative approach), a 10 percent to 27 percent improvement in the tail latency may be gained compared to the traditional conservative or aggressive approaches.

To address the challenges of large scale of operation of streaming workloads, example embodiments are directed to a slow instance mitigation algorithm designed for large-scale streaming pipelines. This algorithm serves to improve tail latencies by aggressively detecting slow instances, and to reduce the load on the underlying resource manager by effectively pruning the number of false positives through a set of filters. The filters consider the structure of the pipeline, its behavior while it is catching up after new replicas are created and the existence of window operations in the pipeline. Thus, example embodiments may achieve a better trade-off between performance and resource requirements than existing alternatives. Accordingly, embodiments described herein provide technical improvements for streaming pipelines and the underlying system infrastructure (e.g., computing devices, servers, networks) on which the streaming pipeline operates, such as improving performance of streaming pipelines with respect to the tail end latency and improving resource utilization by requiring fewer computing resources (e.g., YARN containers, memory) needed to improve the latency.

FIG. 1 is a block diagram of a streaming system 100, according to an embodiment. In an embodiment, system 100 supports applications deployed in a cloud environment. In another embodiment, system 100 may be implemented in a local environment, for example, on the premises of an enterprise.

In an embodiment, system 100 may include a set of loosely or tightly coupled computing devices and/or systems that work together to manage distributed applications such as streaming applications. For example, system 100 may include one or more computer clusters having nodes that are configured to perform tasks. Clusters and/or their components may share a pool of resources (e.g., computing resources, memory, or input/output (I/O)). A cluster environment in which example embodiments are implemented may be very large in scale and heterogenous both in terms of hardware capabilities and deployed software. For example, a data lake implemented in such a cluster environment may be shared among thousands of users that deploy batch, streaming and interactive applications. For instance, a large-scale pipeline may run on thousands of heterogeneous YARN containers (e.g., 3500) in a cloud infrastructure and processes multiple terabytes (e.g., 5.5 terabytes (TB)) of data every day, combining multiple high-value datasets coming from various event streams, dimension tables, and external features. Event streams being fed into the pipeline may be available as files on disks (remote or local). Event streams may also arrive via other means (e.g., from a network port that is monitored by the pipeline, user click data from an event bus, etc.). The e pipeline may include multiple stages (e.g., 27) that are connected either through all-to-all or one-to-one (1-1) connections and maintain terabytes (TB) of internal states data (e.g., 23 TB). Each stage of the pipeline may include a set of process instances ranging from 1 to 250. The stages may perform various analytical tasks, such as selections, projections, joins, windowed aggregations and machine learning tasks. Several stages in such a pipeline may also contact external services such as relational database and various reporting tools exposed to different entities (e.g., advertisers and publishers).

As shown in FIG. 1, system 100 may include a node 104, a node 108 and a node 118 communicatively connected to one another. Node 104, node 108 and node 118 may be physical devices such as computing devices used as servers, and each of the computing devices may include components not shown in FIG. 1 (e.g., processor circuits and memory devices). Additionally, node 104, node 108, and node 118 may be virtual machines. Node 104, node 108 and node 118 may be configured to be the same or different, for example, having different software and/or hardware. While three nodes are depicted in FIG. 1, fewer or far more nodes may be implemented in system 100.

The components of system 100 may be connected to each other via one or more networks, for example, the Internet, local area networks (LANs), wide area networks (WANs), or enterprise network with the appropriate network interfaces. In an embodiment, system 100 may be implemented as a distributed process framework (e.g., Apache Hadoop YARN). In another embodiment, system 100 may operate on top of a cluster resource manager and some form of data storage.

Node 104 may include resource manager 106, which is configured to arbitrate available cluster resources. Thus, resource manager 106 may accept requests (e.g., job submissions) and allocate resources. Resource manager 106 may reside on a separate node, node 104, as depicted in FIG. 1, or on other nodes such as node 108 or node 118. In an embodiment, multiple resource managers may be utilized in a distributed fashion. Thus, tasks may be distributed among the multiple resource managers. However, if one resource manager becomes inactive, the remaining active resource managers may continue to work on behalf of the inactive resource manager. Resource manager 106 may optimize for cluster utilization, enabling full usage of resources all the time, against constraints such as capacity guarantees, fairness, and service level agreements. Node 104 may be communicatively connected to client 102 and storage 126, which may be a data repository of any form, for example, the Cosmos storage system of Microsoft. Storage 126 may be a scalable and fault-tolerant file system that provides a high degree of parallel reads and writes and enables efficient data sharing among various applications.

Node 108 may include a node manager 110, a container 112 and an application master 114, which includes a slow instance mitigator 116. Node manager 110 manages resources available on node 108. Thus, node manager 110 may be responsible for launching containers for applications, monitoring their resource usage (e.g., central processing unit (CPU), memory, disk, network) and reporting the same to resource manager 106. Application master 114 may be an instance of a framework-specific library that is created for each application to negotiate for resources. Application master 114 may work with node manager 110 to execute and monitor tasks. Application master 114 may negotiate appropriate resource containers from resource manager 106. After a resource request is granted by resource manager 106, application master 114 may track the status of any granted resource containers as well as monitor them. While it is typical for each application to have its own instance of an application master (e.g., application master 114), it is feasible to implement an application master to manage multiple applications or to extend its functionalities. For example, application master 114 may include slow instance mitigator 116 to mitigate slow instances, thereby improving tail latencies (e.g., at 95 percent, 99 percent or 99.99 percent) and reducing the load of resource manager 106. While slow instance mitigator 116 is depicted in FIG. 1 as being a resident of node 108 as a part of application master 114, in embodiments, slow instance mitigator 116 may be implemented elsewhere, such as a part of an application.

An application, via application master 114, may request resources with specific requirements, such as resource-name (hostname, rackname, etc.), memory (e.g., in megabytes), CPU (e.g., number of cores), resource-types (e.g., disk, network I/O, graphics processing units), and number of containers. Resource manager 106 may grant a specific resource request with a resource allocation by way of a container, such as container 112. Container 112 may be controlled by node manager 110 and may be assigned resources allocated to the application. In other words, application master 114 may present container 112 to node manager 110 to use the allocated resources to execute its tasks. Thus, application master 114 may work with node manager 110 to launch containers (e.g., container 112) that range from simple scripts (e.g., C, Java®, Python® processes) to virtual machines.

Node 118 may include a node manager 120, a container 122, and an application master 124. Node manager 120 manages resources on node 118 in a similar manner as node manager 110. Container 122 operates similarly to container 112. Application master 124 is similar to application master 114 without slow instance mitigator 116. In an embodiment, application master 114 and application master 124 may be respectively associated with container 112 and 122. In another embodiment, application master 114 and application master 124 may additionally or instead be associated with one or more containers on nodes different from node 108 or node 118. Thus, system 100 enables individual applications, via application masters, to utilize cluster resources in a shared, secure and multi-tenant manner.

Client 102 may be an application client that submits processing jobs to resource manager 106, which works with application masters (e.g., application master 114 and application master 124) and node managers (e.g., node manager 110 and node manager 120) to schedule, run and monitor jobs. For example, a client, such as client 102 may submit an application, including the necessary specifications to launch an application master specific to the application, such as application master 114. Resource manager 106 may negotiate a specific container to start application master 114. Application master 114 registers with resource manager 106 upon startup, thereby allowing client 102 to communicate with application master 114 and query resource manager 106 for details. While operating normally, application master 114 may negotiate appropriate resource containers via a resource-request protocol from resource manager 106. When a request is successful, application master 114 launches the granted container, such as container 112, to node manager 110. The launch specification may include data necessary to allow container 112 to communicate with application master 114. The application code executing within container 112 may provide information (e.g., progress, status) to application master 114 via application-specific protocol(s). Application master 114 may deregister with resource manager 106 when the application finishes execution, thereby allowing associated containers to be reused.

Streaming applications may be expected to operate on a continuous basis (e.g., 24/7), and thus the streaming infrastructure must be resilient to failures. For this reason, a streaming system (e.g., system 100) may periodically create checkpoints to quickly recover from failures. The checkpoints may be internal states of a streaming application that is saved or backed up to a storage (e.g., storage 126 of FIG. 1). In an embodiment, a streaming system, such as system 100, supports exactly once semantics, which essentially means that each event that flows through a streaming pipeline is guaranteed to be processed once and only once.

A streaming application may be logically represented as a directed acyclic graph whose vertices correspond to data processing stages and edges correspond to streams of events. This logical representation may be translated into a physical plan before the actual execution of the application. The physical plan may specify the number of process instances for each stage (degree of parallelism) as well as the data routing mechanism across stages. The process instances may comprise, for example and without limitation, long-running processes that consume streams of events, perform some computation on them, and output new event streams.

Figure 2:
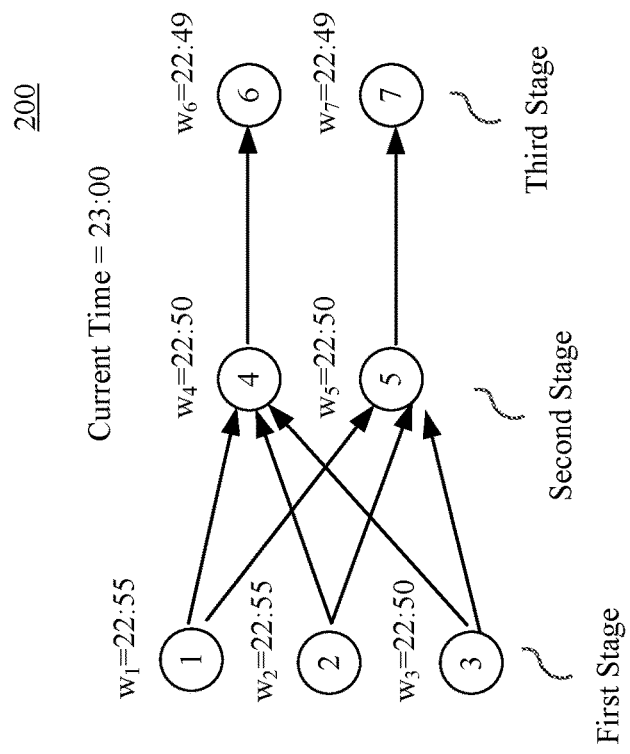
FIG. 2 depicts a job graph of an application, according to an embodiment.

FIG. 2 depicts a job graph 200 of an application, according to an embodiment. Job graph 200 is an example of a physical plan of an application that includes three stages. Each stage includes a set of instances whose number is determined by a streaming system (e.g., system 100 of FIG. 1) optimizer. In job graph 200, the first stage includes three process instances 1, 2, and 3. The second stage includes two process instances 4 and 5. The third stage includes two process instances 6 and 7. Data from the first stage flows to the second stage through an all-to-all communication mechanism, whereas data is distributed from the second stage to the third stage through 1-1 connections.

If $I_s$ is a set of process instances belonging to a stage s, given two process instances i and j, the notation i→j may be used to denote that process instance i is a parent of process instance j in the physical plan of an application. For instance, 1→4 denotes that process instance 1 is a parent of process instance 4, as shown in job graph 200 of FIG. 2. The relationship between a process instance and its parent is a direct relationship or direct connection. The notation i⇒j may be used to denote that there is a path from process instance i to process instance j in the job graph. For example, in job graph 200, there is a path from process instance 1 to process instance 6, which may be denoted as 1⇒6. Similar notations may be used to denote parent-child relationships between stages in a job graph. For example, p→s denotes that stage p is a parent of stage s, and p⇒s denotes that there is path from stage p to stage s in a job graph, such as job graph 200.

In an embodiment, each event $e_v$ entering a streaming system (e.g., system 100) is marked with a timestamp $t_v$ that denotes the time that the particular event was generated, also known as event time. Note that multiple events may have the same event time if they were generated at the same time. In an example embodiment, event time increases at a granularity of a minute. To evaluate the progress of events through the streaming pipeline, the streaming system may use watermarks. Watermarks flow as part of data streams and carry a timestamp t. A watermark denotes that there should be no more events from the stream with a timestamp t'≤t.

Each process instance maintains an internal event time clock that is set based on the watermarks that it receives from its input streams. A process instance's current event time/watermark denotes that by that point there should be no more events with a timestamp less than the watermark that have not been processed by the process instance. In particular, the process instance's current watermark is at most the minimum of the watermarks of its input streams. Thus, a watermark of a process instance represents an event time associated with a slowest input stream to that process instance. As its input streams update their watermarks, so does the process instance. The watermark of an instance i at time t may be defined as:

$$w_i(t)=t_v \text{ such that } \nexists \text{ event } e_u \text{ with } t_u \leq t_v \leq t \tag{1}$$

in a process instance's input streams.

Referring back to FIG. 2, the watermark of each process instance is depicted above each process instance in job graph 200 at time t=23:00. As shown in FIG. 2, two out of three process instances (process instances 1 and 2) belonging to the first stage have processed all events whose event time is less than or equal to 22:55, whereas the third process instance (process instance 3) is slightly slower and has processed all events with timestamps up to 22:50 only. Since the second stage receives data from the first stage through an all-to-all communication mechanism, the watermark of the second stage should be less than or equal to the minimum watermark of the output streams of the first stage (which is the slowest input stream to the second stage). As shown in FIG. 2, the minimum value is 22:50 as determined by the output streams of process instance 3. When a process instance is slower than its peers, the watermarks of its children in the job graph are also impacted.

In FIG. 2, process instances 6 and 7 belonging to the third stage have lower watermarks than their corresponding parents, process instances 4 and 5, respectively. This difference is due to the processing latency that the third stage adds on top of the second stage. Generally, as data flows through the stages of the stream application (as represented by the job graph in FIG. 2), the watermarks of the downstream stages are expected to gradually decrease since every stage adds its own processing latency. In FIG. 2, the second and third stages are downstream stages with respect to the first stage, whereas the first stage is an upstream stage with respect to the second and third stages.

Many streaming applications are latency critical. In an embodiment, latency may be defined at the process instance level. The latency of a process instance represents how far the process instance's watermark is behind the current time. The watermark latency $l_i$ of process instance i at time t may be defined as:

$$l_i(t)=t-w_i(t) \tag{1}$$

For example, process instance $i_{11}$ in job graph 200 of FIG. 2 has a watermark latency of 5 minutes, as its watermark is 5 minutes behind the current time of 23:00, whereas process instance $i_{13}$ has a latency of 10 minutes. Note that the latency of a process instance keeps changing as its watermark gets updated over time. Since a job may run for multiple hours, for each process instance, it is possible to generate a distribution of its watermark latency over time.

The end-to-end latency of a pipeline is determined by the watermark latency of the final stages in the job graph (leaf nodes). In the example application associated with job graph 200, the latency of the process instances belonging to the third stage is 11 minutes at time 23:00. This essentially means that a newly generated event will take about 11 minutes to flow through the streaming pipeline.

The cumulative distribution function (CDF) of the end-to-end latencies observed while an application is running represents both average and tail latencies. Latency SLOs are typically defined based on the 99$^{th}$ percentile of the end-to-end latencies. For an example pipeline, the cumulative distribution of the end-to-end latency measured over 180 hours results in approximately 502,000 data points. In this example, the median latency of the job is about 12 minutes. However, the 99$^{th}$ percentile is 52.8 minutes, which is 4.4 times higher than the median. The maximum latency observed for this example pipeline was 95 minutes. Accordingly, this data demonstrates that it is quite challenging to enforce "tight" latency SLOs. The main reasons behind the high 99$^{th}$ percentile latency are resource contention due to noisy neighbors and issues related to the underlying storage system. In particular, since the example pipeline runs in a shared cloud environment along with batch jobs, contention for CPU and memory results in process instances running slower than expected. Occasionally, a process instance that attempts to write to disk might get blocked due to issues in the external storage system, which may cause further delays affecting the 99$^{th}$ percentile latency. From the perspective of a streaming system, such as system 100 shown in FIG. 1, all the above issues manifest in the same way: one or more process instances of the streaming pipeline become slow (have higher watermark latency than expected) or are simply idle and thus do not make any progress.

To address the slow process instance issue, process instances may be replicated when they run slower than expected. In the case of resource contention, the replica is placed in a new YARN container that might be assigned to a physical node that is not overloaded. The replica will read the last checkpoint, initialize its internal state and then process the remaining events while advancing its watermark in a catchup process. When the replica has caught up, the streaming system may discard the old process instance and replace it with the replica. Replicating the process instance may occasionally help with external storage issues as well since the replica will attempt to write to a different temporary file and the new write operation might not get blocked.

Based on detailed analysis of data corresponding to 780 hours of runtime of an example large-scale pipeline, 218 cases were identified that may be traced back to latency spike into one or more slow instances affecting the overall performance. In about 59 percent of the cases, the slowdown was caused by a single process instance running slower than expected. In about 41.3 percent of the cases, the latency spike was due to multiple slow process instances in the pipeline. Of these multiple slow process instances, in about 25 percent of the cases, the slow process instances belong to the same stage. This may happen when the stage is memory or CPU intensive and there is resource contention in the cluster. Thus, multiple instances of the same stage might slow down, resulting in high latency. In about 15 percent of the cases, slow instances appearing across two stages that are directly connected in the pipeline. Only in about 0.4 percent of the cases were there multiple slow instances across more than two stages.

A. Identifying Slow Process Instance Candidates

One approach to determine whether a process instance is slow in both streaming and batch processing systems is to compare its performance with that of its peers (e.g., other process instances belonging to the same stage in the streaming application). When the SLOs are latency-driven, the watermark latency may be used as the performance metric to compare instances. The instances which have higher watermark latency than their peers would be considered slow and should be replicated.

A process instance $i \in I_s$, is considered slow at time t if:

$$l_i(t) \geq \underset{j \in I_s}{\text{median}}\, l_j(t) + \varepsilon,\, \varepsilon > 0 \tag{3}$$

Referring back to FIG. 2, the median watermark latency of the process instances belonging to the first stage is 5 minutes. Note that process instance 3 has a higher watermark latency (10 minutes) than the median watermark latency. For ε<5, process instance 3 would be considered a slow instance for which an action (e.g., mitigation measure) may be taken. In an embodiment, a slow instance mitigation policy may be periodically invoked (e.g., every minute) to determine the set of slow instances using equation 3 and perform the appropriate mitigation measure (e.g., request the appropriate replicas). In an embodiment, equation 3 uses the median to represent the aggregate performance of process instances in a stage. In other embodiments, the standard deviation, mean, etc., may be used instead. The median may be better to show the impact of a slow process instance in the end-to-end latency in some cases.

In equation 3 above, the threshold value of E determines how aggressive or conservative a policy is when detecting slow instances. In other words, the threshold value of E corresponds to a degree of aggressive or conservativeness in identifying slow process instance candidates. An aggressive policy (having a low threshold value) mitigates slow process instances as soon as they appear and thus reduces their impact on the end-to-end latency. Conversely, a conservative policy (having a high threshold value) does not overreact to temporary slowdowns as it waits for some time before confirming that an anomaly is a real slow process instance.

Surprisingly, the performance of a conservative policy and an aggressive policy when applied on a large-scale pipeline are similar. Indeed, there are cases where the conservative approach has a better tail latency than the aggressive approach despite the fact that the aggressive policy identifies slower instances and requesting replicas much faster than the conservative policy. The aggressive policy may request an order of magnitude more resources than the conservative policy. For example, the maximum number of containers requested by the aggressive approach in a policy cycle may be more than 250. In contrast, the conservative policy may request fewer than 30 containers. In addition, when the aggressive policy was applied in one example large-scale pipeline, about 40 percent of the container requests were not granted by a cluster resource manager (e.g., resource manager 106 of FIG. 1), whereas in the case of the conservative policy, only 2 percent of the requests were not successful. When the number of containers requested at once is high (e.g., greater than or equal to 200), some of the requests may be denied. The rejection rate significantly increases as the number of containers requested increases. Large-scale applications may request hundreds of containers at once for slow process instance mitigation, thus this limitation becomes critical.

In the above example, a new replica was created when it was requested only for 60 percent of the slow process instances identified by the aggressive policy. The remaining 40 percent of slow instances did not get a container on time and the policy has to request the containers in some subsequent policy invocations. As a result, some "real" slow process instances were not allocated that eventually got automatically-mitigated (false positives) were replicated and used a significant portion of resources. For this reason, the end-to-end latency using the aggressive policy may not better than the one produced with the conservative policy.

Furthermore, the resource requirements of the aggressive policy significantly exceed the additional resources (e.g., 10 percent) reserved for a particular pipeline. Besides classifying a large number of process instances as slow and requesting replicas for each of them, the aggressive policy frequently resorts to requesting multiple replicas for the process instances exhibiting a low catchup rate. As a result, the quota of reserved resources may be quickly depleted. Increasing the reserved resources may not be an attractive option as these resources may not be available for other jobs. Example embodiments provide more resource efficient ways to address this issue.

In particular, an example embodiment is especially designed for minimizing tail latency of very large-scale pipelines using the following design principles. The example embodiment adopts an aggressive approach as early detection of anomalies is necessary in order to reduce tail latency. It also reduces the number of resource requests by filtering the set of candidate slow instances, making sure that replicas for "real" slow instances will be created on time. In particular, a set of filters are applied that consider the structure of the streaming application), the behavior of the pipeline during catchup, and the existence of window operations in the pipeline to reduce the number of false positives. This example embodiment may be implemented with the following algorithm.

Data: Current time t, job graph G, application metrics, replica requests issued in the previous policy cycles

```
                    Result: a set of replica requests R
 1  C(t) = ∅; // Identifying slow process instance candidates while exploiting
    the job graph
 2  for every instance i ∈ G do
 3    if Condition 5 is true then
 4      C(t) = C(t) + {i};
 5  end
    // Filter1: Considering the window operations
 6  for every instance i ∈ C(t) do
 7    if i ∉ C(t - 1) then
 8      C(t) = C(t) - {i};
 9  end
    // Filter2: Considering the behavior during catchup
10  for every instance i for which a replica has recently been created
    do
11    t(i) = time the replica of i was scheduled;
12    if t - t(i) < t_s then
13      F = { downstream instances of i that were
14      affected by i's slowdown};
15      C(t) = C(t) - F;
16  end
17  R = {replica requests for all instances in C(t)};
18  return R;
```

Figure 3:
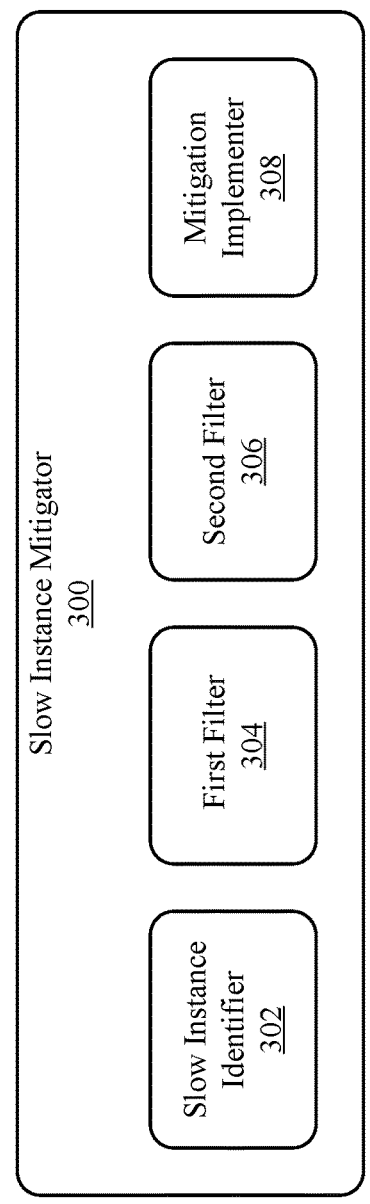
FIG. 3 is a block diagram of a slow instance mitigator, according to an embodiment.

Numerous ways exist to mitigate slow process instances. For example, FIG. 3 is a block diagram of slow instance mitigator 300, according to an embodiment. Slow instance mitigator 300 may comprise a particular implementation of slow instance mitigator 116 of system 100 as shown in FIG. 1, according to an embodiment. Slow instance mitigator 300 includes a slow instance identifier 304, a first filter 304, a second filter 306 and a mitigation implementer 308. The components of slow instance mitigator 300 will be further described below and in connection with subsequent figures.

Figure 4:
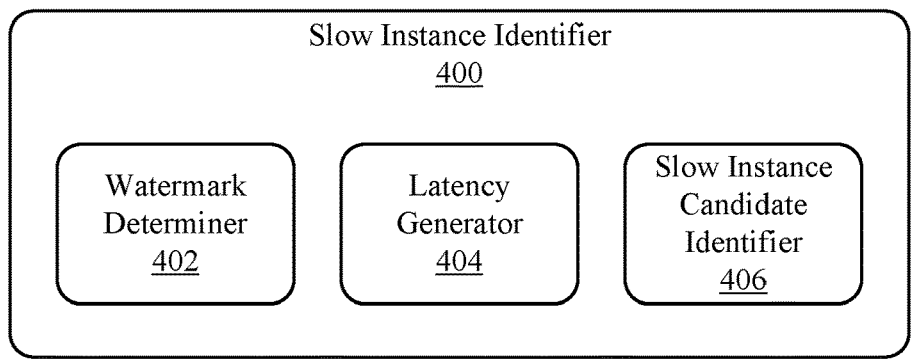
FIG. 4 is a block diagram of a slow instance identifier, according to an embodiment.

According to the above algorithm, the first step in the process is to identify a set of candidate instances C that are likely to cause an increase in the end-to-end latency. FIG. 4 is a block diagram of a slow instance identifier 400, according to an embodiment. Slow instance identifier 400 may be an example implementation of slow instance identifier 304 of FIG. 3, according to an embodiment. Slow instance identifier 400 may include a watermark determiner 402, a latency generator 404 and a slow instance candidate identifier 406, each of which will be further described below and in connection with subsequent figures.

Figure 5:
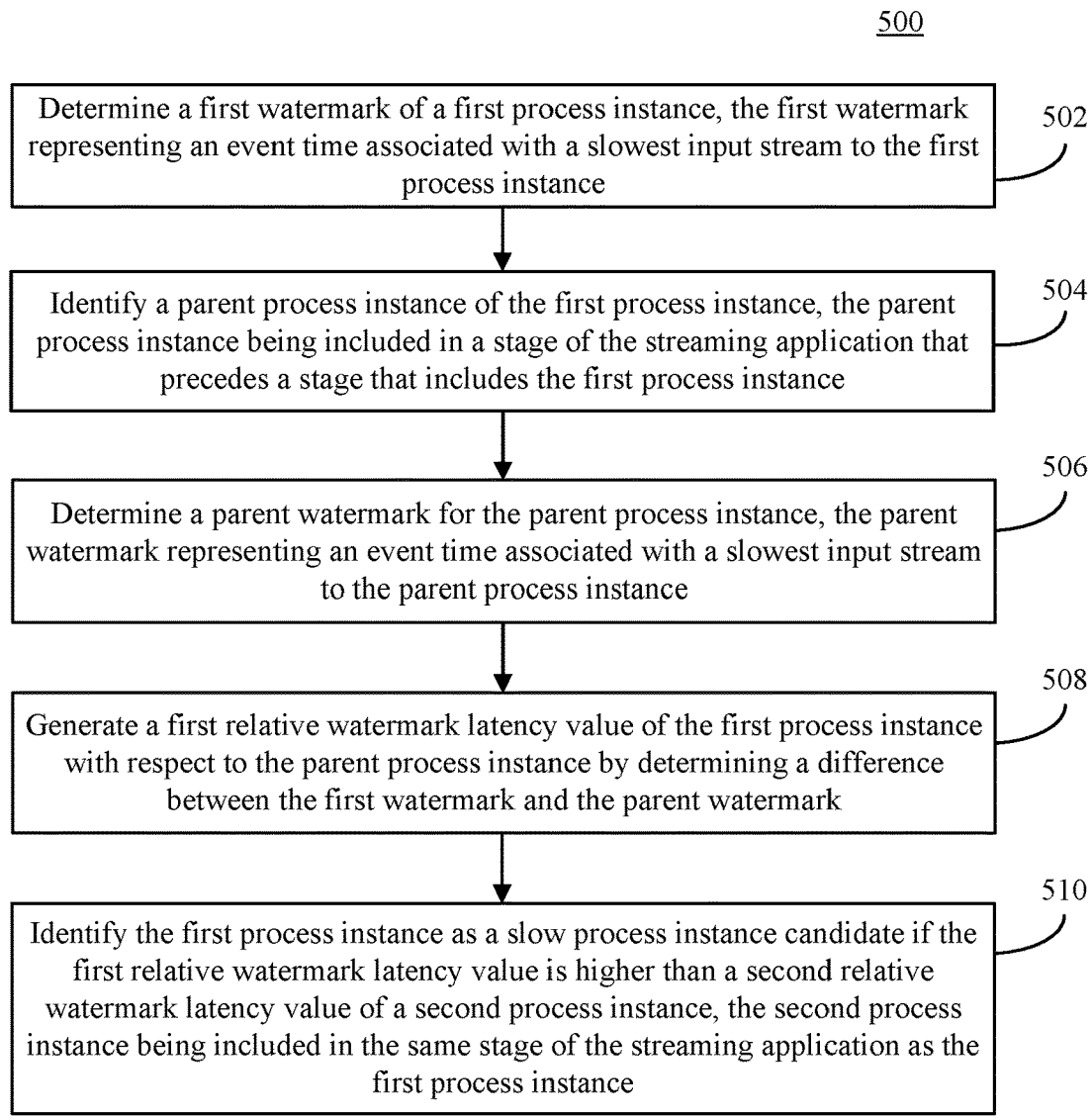
FIG. 5 depicts a flowchart of a method for identifying slow process instances, according to an embodiment.

For example, FIG. 5 depicts a flowchart 500 of a method for identifying slow process instances, according to an embodiment. The method of flowchart 500 may be implemented, for example, by slow instance identifier 400 of FIG. 4.

Flowchart 500 begins with step 502, in which a first watermark of a first process instance is determined, the first watermark representing an event time associated with a slowest input stream to the first process instance. For example, and with reference to slow instance identifier 400 of FIG. 4, watermark determiner 402 may determine a first watermark of a first process instance. The first watermark may represent an event time associated with a slowest input stream to the first process instance. For example, as shown in FIG. 2, the first watermark of process instance 4 is 22:50, which represents the event time associated with the slowest input stream to process instance 4.

In step 504, a parent process instance of the first process instance is identified, the parent process instance being included in a stage of the streaming application that precedes a stage that includes the first process instance. For example, watermark determiner 402 may also identify a parent process instance of the first process instance. The parent process instance may be in a stage of the streaming application that precedes a stage that includes the first process instance. As an example, in job graph 200 of FIG. 2, process instance 1 is a parent of process instance 4.

In step 506, a parent watermark for the parent process instance is determined, the parent watermark representing an event time associated with a slowest input stream to the parent process instance. For example, watermark determiner 402 may determine a parent watermark for the parent process instance, where the parent watermark represents an event time associated with a slowest input stream to the parent process instance. To continue with the above example, as shown in FIG. 2, the parent watermark of process instance 1 is 22:55, which represents the event time associated with the slowest input stream to process instance 1 as a parent of process instance 4.

In step 508, a first relative watermark latency value of the first process instance with respect to the parent process instance is generated by determining a difference between the first watermark and the parent watermark. For example, and with reference to FIG. 4, latency generator 404 is configured to generate a first relative watermark latency value of the first process instance with respect to the parent process instance by subtracting the first watermark from the parent watermark. The relative watermark latency of a process instance denotes how far behind its watermark is relative to the watermarks of the process instances belong to its parent stage. Thus, the relative watermark latency of instance i with respect to its parent stage p at time t may be defined as:

$$r_i^p(t) = \min_{\substack{j \in I_p \\ j \to i}}(w_j(t)) - w_i(t) \quad (4)$$

Equation 4 above determines the parent process instance of i that has the minimum watermark and computes how far behind i is from that process instance. The parent process instance with the minimum watermark is considered as this is the process instance that might create a slowdown for instance i. To continue with the above example, as shown in FIG. 2, the relative watermark latency of process instance 6 with respect to its parent stage is 1 minute, as process instance 6 is 1 minute behind process instance 4. Similarly, the relative watermark latency of process instance 7 is also 1 minute as process instance 7 is 1 minute behind its parent process instance 5. The process of determining relative watermarks will be described in further detail in connection with FIGS. 6-8.

In step 510, the first process instance is identified as a slow process instance candidate if the first relative watermark latency value is higher than a second relative watermark latency value of a second process instance, the second process instance being included in the same stage of the streaming application as the first process instance. For example, and with reference to FIG. 4, slow instance candidate identifier 406 may identify the first process instance as a slow process instance candidate if the first relative watermark latency value is higher than a second relative watermark latency value of a second process instance. In the example above, because process instance 6 and process instance 7 both have the same relative watermark latency value of 1 minute, neither of them is considered a slow process instance candidate. The steps of determining a watermark for a process instance as well as a watermark for its parent process instance may be repeated for each process instance in the same stage. Thus, steps 502-508 may be repeated as necessary for every process instance. Step 510 will also be described in further detail in connection with FIGS. 6-8.

In addition to identifying slow instances by solely relying on the watermark latency values (e.g., as presented in equation 3), the above algorithm explores the structure of the streaming application (which may be represented by a job graph) to determine dependencies between slow process instances. In particular, the algorithm examines whether the behavior of a slow process instance is a result of one of its parent process instances being slow. In this case, such process instance should not be added to the candidate set as the slowdown is caused by an upstream stage.

Figure 6:
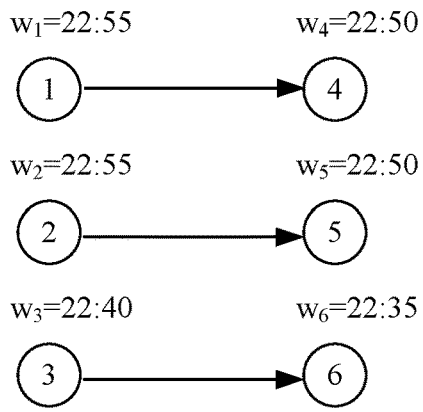
FIG. 6 depicts a relationship between dependent slow process instances, according to an embodiment.

For example, FIG. 6 depicts a relationship between dependent slow process instances in a job graph 600, according to an embodiment. In job graph 600, there are two stages with three instances in each. The two stages are connected through 1-1 connections. Process instances 3 and 6 are 15 minutes behind their peers and thus may be considered slow, according to equation 3 (for ε≤15). However, upon inspection, process instance 6 could not have a watermark higher than 22:40 since its parent process instance has not advanced its watermark beyond that value. Also, similar to process instances 4 and 5, which are 5 minutes behind their parent process instances, process instance 6 is also 5 minutes behind its parent process instance 3. Thus, process instance 6 is not inherently slower than its peers, but is rather constrained by the progress made by its parent process instance 3. Accordingly, process instance 6 may be considered a dependent slow process instance. Dependent process instances are not taken to be a part of the candidate set C as taking an action on them (e.g., replicating them) will not have any impact on their performance.

Figure 7:
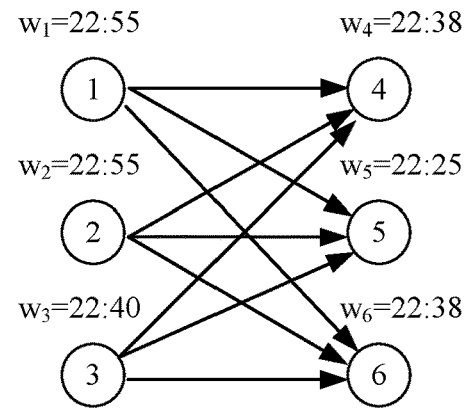
FIG. 7 depicts a relationship between independent slow process instances, according to an embodiment.

As another example, FIG. 7 depicts a relationship between independent slow process instances of a job graph 700, according to an embodiment. In this example, process instances 3 and 5 are 15 and 13 minutes behind their peers, respectively. Given the all-to-all communication pattern, the watermark of process instances 4, 5 and 6 cannot exceed 22:40. This is because the 22:40 value is the minimum watermark among their parent instances, corresponding to process instance 3. Note that although process instance 4 and 6 are 2 minutes behind process instance 3, process instance 5 is much slower (15 minutes behind). Thus, the behavior of process instance 5 is not caused by the slowdown of its parent process instance 3, given that its peers does not face the same problem. In this case, process instance 5 may be added to the candidate set C.

To determine which slow process instances are dependent on others, the notion of relative watermark latency is used. The relative watermark latency of a process instance denotes how far behind its watermark is relative to the watermarks of the process instances belonging to its parent stage. Thus, the relative watermark latency of instance i with respect to its parent stage p at time t may be defined as equation 4 as set forth above in connection with step 508 of FIG. 5. Equation 4 above essentially finds the parent process instance of i that has the minimum watermark and computes how far behind i is from that process instance. The parent process instance with the minimum watermark is considered as this is the process instance that might create a slowdown for instance i. For example, in FIG. 7, the relative watermark latency of process instance 5 with respect to its parent stage is 15 minutes, as process instance 5 is 15 minutes behind process instance 3. Similarly, the relative watermark latency of process instances 4 and 6 is 2 minutes (computed based on process instance 3).

In an embodiment, the relative watermark latency of each process instance in a stage with respect to its parent stage is computed. Then, the process instances whose relative watermark latency is higher than that of their peers may be selected to determine slow instance candidates. Referring to FIG. 7, process instance 5 may be considered a slow process instance candidate as its relative latency is much higher than that of its peers (process instances 4 and 6). However, process instance 6 in FIG. 6 may not be considered a slow process instance candidate as its relative latency is 5 minutes, similar to its peers (process instances 4 and 5). This is the correct decision since, as discussed above, process instance 6 is a dependent slow process instance.

It is common for a stage to have multiple parent stages. The process instances of such stages will have multiple relative latency values, each one related with a different parent stage. Thus, in the case of multiple parent stages, a process instance may be considered a slow process instance candidate according to the following equation at the stage level. A process instance $i \in I_s$ will be placed in the slow instance candidate set C if:

$$r_i^p(t) \geq \underset{j \in I_s}{median} \{r_j^p(t)\} + \varepsilon, \forall\ p:\ p \to s, \varepsilon > 0 \quad (5)$$

Figure 8:
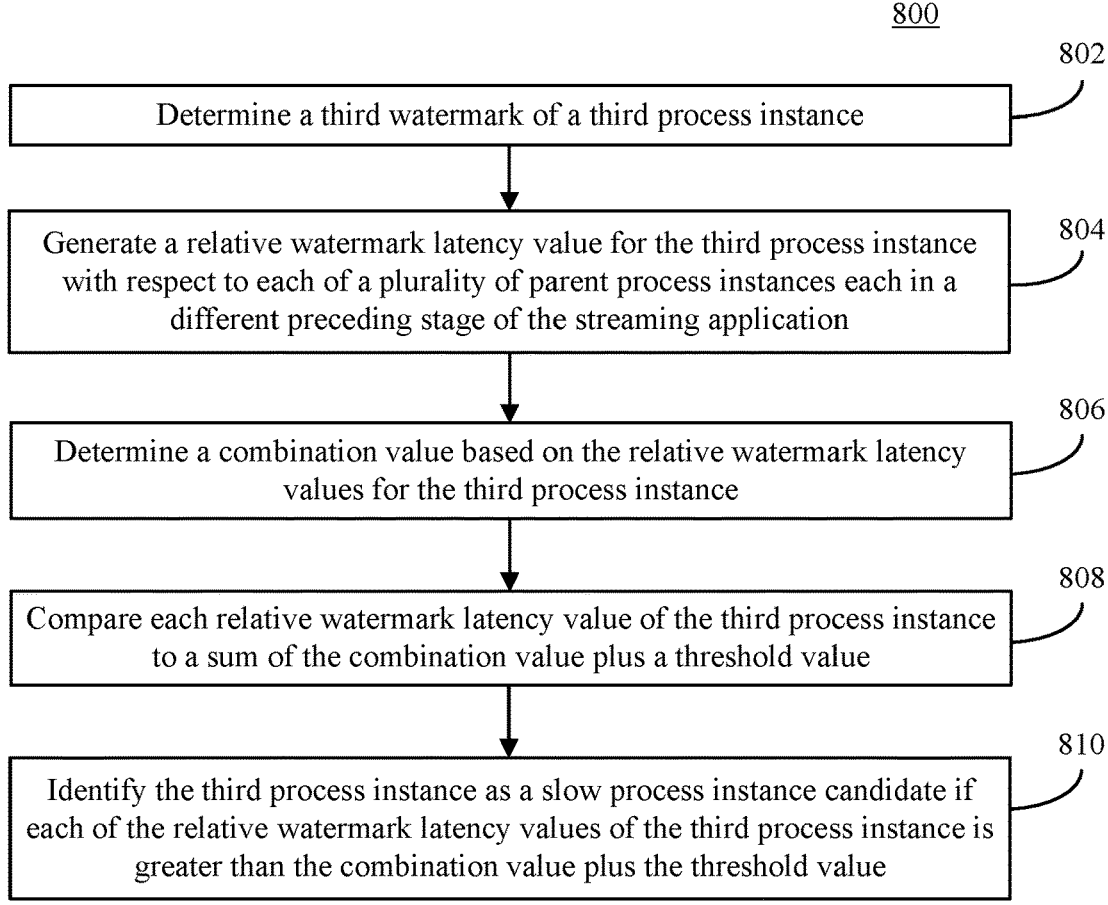
FIG. 8 depicts a flowchart of a refinement to the flowchart of FIG. 4 for a stage having multiple parent stages, according to an embodiment.

FIG. 8 depicts a flowchart of a refinement to the flowchart of FIG. 4 for a stage having multiple parent stages, according to an embodiment. This embodiment may implement equation 5 above. FIG. 8 begins with step 802. In step 802, a third watermark of a third process instance is determined. For example, and with reference to FIG. 4, watermark determiner 402 may determine a third watermark of a third process instance. The third process instance may include a plurality of parent process instances having corresponding parent watermarks. As an example, a third stage may include the third process stage, which may be a child of all process instances of a first stage and a child of all process instances of a second stage. In this example, the respective process instances of the first stage and the second stage are parent process instances of the third process instance.

In step 804, a relative watermark latency value is generated for the third process instance with respect to each of a plurality of parent process instances each in a different preceding stage of the streaming application. For example, latency generator 404 may generate a relative watermark latency value for the third process instance with respect to each of a plurality of parent process instances, each of which may be in a different preceding (e.g., upstream) stage of the streaming application. In equation 5 above, $r_i^p(t)$ is the relative watermark latency value for the third process with respect to each of its parent process instances in different preceding stages.

In step 806, a combination value is determined based on the relative watermark latency values for the third process instance. For example, latency generator 404 may further determine a combination value based on the relative watermark latency values for the third process instance. Such a combination value may be a mean, a median, a standard deviation, an aggregate value, etc. of the relative watermark values of the third process instance. In equation 5 above, the median value $$\underset{j \in I_s}{median} \{r_i^p(t)\}$$

is used as the combination value.

In step 808, each relative watermark latency value of the third process instance is compared to a sum of the combination value plus a threshold value. For example, latency generator 404 may compare each relative watermark latency value of the third process instance to a sum of the combination value (e.g., mean, median, standard deviation, etc.) and a threshold value. In equation 5 above, the threshold value is denoted as E. As described above in reference to equation 3, the threshold value E may determine the degree of aggressiveness or conservativeness of a mitigation policy when detecting slow process instances. An aggressive policy that has a low threshold value may mitigate slow process instances as soon as they occur and thus reduces their impact on the end-to-end latency. In contrast, a conservative policy that has a high threshold value does not overreact to temporary slowdowns, and may wait for some time before confirming that an anomaly is a caused by a real slow process instance. An aggressive policy may be needed to significantly reduce the tail latency, the threshold value E may be set to a low value (e.g., 3 minutes). This means that if the relative latency of a process instance is 3 or more minutes behind that of its peers, then that process instance may be placed in the slow process instance candidate set C.

Flowchart 800 concludes with step 810. In step 810, the third process instance is identified as a slow process instance candidate if each of the relative watermark latency values of the third process instance is greater than the combination value plus the threshold value. For example, slow instance candidate identifier 406 of FIG. 4 may identify the third process instance as a slow process instance candidate if each of the relative watermark latency values of the third process instance is greater than the combination value plus the threshold value. For example, a process instance may be identified and placed in the slow instance candidate set C if each of the relative watermark latency values of the third process instance satisfies the condition of equation 5 for all parent process instances (or all parent stages) of the third process instance. For example, if each of the relative watermark latency values of the third process instance is greater or equal to the sum of the median of the relative watermark latency values of the third process instance and the threshold value E, for all parent stages, then the third process instance may be identified as a slow process instance candidate. In an example where a first stage and a second stage are parents of a third stage, and there is a process instance in the third stage whose relative latency is high compared to stage 1, but is not high compared to stage 2, then it is not possible to definitively conclude that this process instance is slow. If the process instance is really slow, then it would be slow compared to both parent stages.

To identify slow instance candidates at the source stages (stages that do not have any parents) in a job graph, equation 3 described above may be used.

B. Window Operations

In streaming pipelines, performing operations on the data contained in temporal windows is a common pattern. For example, a large-scale pipeline may contain 17 stages that perform windowing operations such as aggregations. The process instances belonging to these stages advance their watermarks by N minutes, where N is the length of the window.

Figure 9:
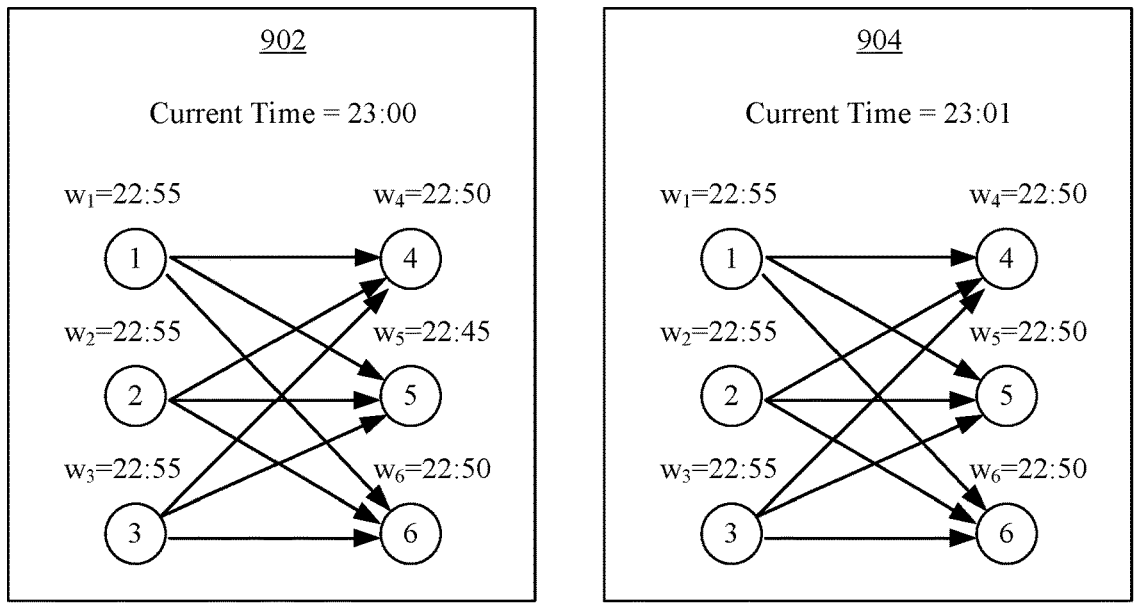
FIG. 9 depicts a diagram depicting behavior of stages with window operations, according to an embodiment.

FIG. 9 depicts a diagram 900 depicting behavior of stages with window operations, according to an embodiment. FIG. 9 shows job graph 902 associated with a current time of 23:00 and job graph 904 after one minute, 23:01, for an example streaming application. The second stage shown in job graph 902 performs a windowed aggregation with a 5-minute window. The process instances of this second stage advance their watermarks by 5 minutes at a time (e.g., see process instance 5 in job graph 904 at time 23:01). Such a stage poses new challenges for slow instance mitigation because small fluctuations in that stage may result in many false positives leading to multiple container requests. In FIG. 9, at time 23:00, process instance 5 may be considered slow since its relative latency is 5 minutes more than that of its peers (for $\varepsilon \le 5$). However, in the next minute, 23:01, process instance 5 advances its watermark by 5 minutes and now its relative latency is the same with that of its peers. Thus, classifying process instance 5 as slow at 23:00 would result in a false positive and an unnecessary container request.

To avoid creating such a redundant replica, the slow instance mitigator (e.g., slow instance mitigator 300 of FIG. 3) may determine whether the slow instances persist in the last two policy invocations (using equation 5). With this filtering process, process instances are more likely to be "real" slow process instances that will not be automatically-mitigated soon. This approach is independent of the window length and may be applied to any stage in the pipeline using the algorithm (e.g., lines 6-9) above. In an embodiment, the mitigation policy may be invoked at every watermark increment (or longer but not less than the watermark increment). For example, if the watermarks are monitored every minute, two process instances of the same stage may report their watermarks at different times, slightly out of sync. Then, if based only on the first invocation of the mitigation policy, it may be possible to conclude that the other process instance is slow. However, by looking for repetition (determining whether slow process instance candidates persist over some number of mitigation policy invocations), it is possible to determine whether a process instance has been delayed for a considerably long time without having to account for the window length. This filtering process may be applied to all process instances of an application, regardless whether the process instances are performing window operations. In practice, this approach may reduce the number of false positives significantly, for example, up to 67 percent reduction.

The above approach may be implemented in a number of ways. For example, FIG. 10 depicts a flowchart of a method of mitigating a slow process instance after application of a filter, according to an embodiment.

Figure 10:
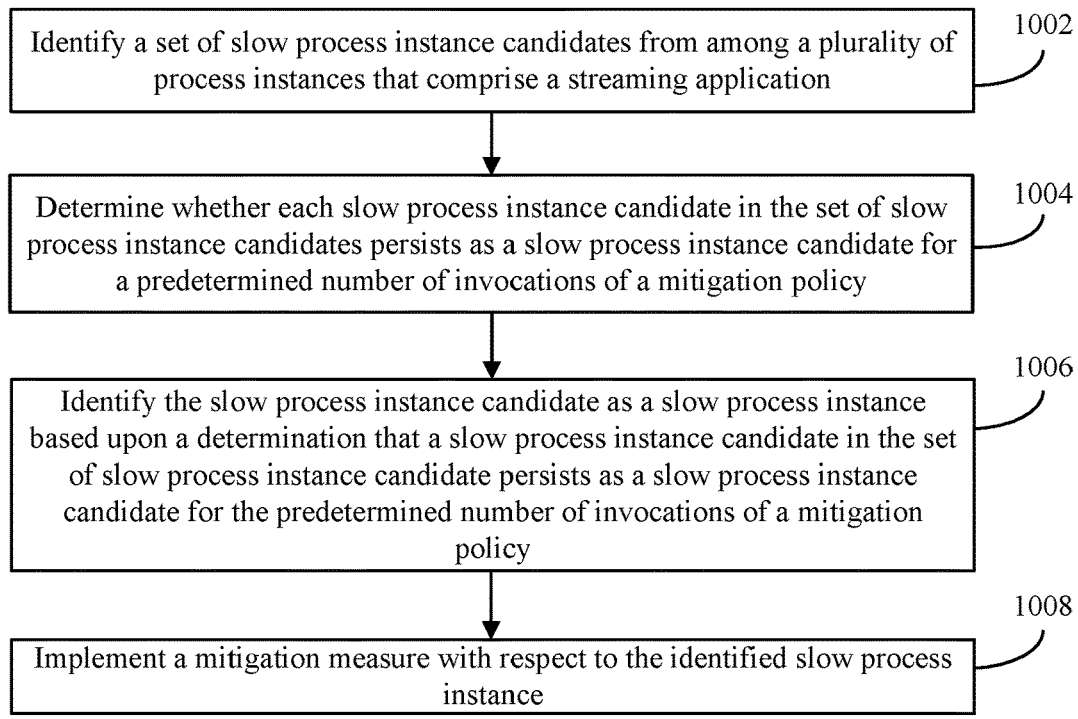
FIG. 10, depicts a flowchart of a method of mitigating a slow process instance after application of a filter, according to an embodiment.

FIG. 10 begins with step 1002, a set of slow process instance candidates is identified from among a plurality of process instances that comprise a streaming application. For example, and in reference to FIG. 3, slow instance identifier 302 may determine a set of slow process instance candidates C from among a plurality of process instances that comprise a streaming application. The identification of slow process instance candidates may be determined based on a watermark latency value, a relative watermark latency value, or a combination of both as described above.

In step 1004, it is determined whether each slow process instance candidate in the set of slow process instance candidates persists as a slow process instance candidate for a predetermined number of invocations of a mitigation policy. For example, and in reference to FIG. 3, first filter 304 may determine whether each slow process instance candidate in the set of slow process instance candidate persists as a slow process instance candidate for a predetermined number of invocations of a mitigation policy. To determine whether a process instance candidate should be filtered from the set of slow process instance candidate (repetition is needed) for any predetermined number (e.g., two) of invocations of a mitigation policy. In some cases, setting the predetermined number to a very low number may lead to misleading results, whereas setting that number to a high number may result a conservative mitigation policy if a process instance is truly slow. Thus, the predetermined number may be set based on the degree of aggressiveness or conservativeness desired in a mitigation policy.

In step 1006, the slow process instance candidate is identified as a slow process instance based upon a determination that a slow process instance candidate in the set of slow process instance candidates persists as a slow process instance candidate for the predetermined number of invocations of a mitigation policy. For example, and in reference to FIG. 3, first filter 304 may identify the slow process instance candidate as a slow process instance based upon a determination that a slow process instance candidate in the set of slow process instance candidates persists as a slow process instance candidate for the predetermined number of invocations of a mitigation policy. For example, if the predetermined number is set to two, a slow process instance candidate in the set may be considered a slow process instance by first filter 304 if it continues to be identified as a slow process instance candidate after two invocations of the mitigation policy.

In step 1008, a mitigation measure is implemented with respect to the identified slow process instance. For example, and in reference to FIG. 3, mitigation implementer 308 may implement a mitigation measure with respect to the identified slow process instance. As described above, a mitigation measure for a slow process instance may include replicating such a slow instance, although other mitigation measures may also be applied by mitigation implementer 308. A mitigation measure may depend on the issue that is impacting the latency. For example, if a slowdown is caused by a network issue or an external service, the appropriate measure such as switching to a different network or external service may be used. A mitigation measure may include duplicating a slow process instance, utilizing a physical data center instead of a virtual machines or vice versa, avoiding slow nodes, limiting resources with thresholds to avoid overloading a streaming system, modifying a job graph of an application to promote efficient resource usage, etc. In an embodiment, replicating a slow instance may include requesting a new YARN container from a resource manager (e.g., resource manager 106 of FIG. 1) to create a replica or duplicate process instance of the slow process instance. In practice, process instances may be frequently checkpointed, thus the internal state(s) of an application may be frequently saved or backed up to memory to enable a relaunch at any given point in time. The replica may use its own checkpoint to initialize its internal state(s), but may cross check events from the parent process instance(s) in order to bypass the slow process instance. For example, a checkpoint for a slow process instance may be taken at 11:00, and a replica may start at 11:05. The replica already knows the internal state at 11 because of the last checkpoint. However, the replica may need to rely on a parent process instance for the last 5 minutes of data to catch up to the current time. When the replica catches up, when each watermark is the same as the instance that the replica is duplicating (or slightly before but not after), the old (slow process instance) is removed and the output of the replica is connected to the input of the next stage.

C. Catchup Behavior

As noted above, a slow process instance may cause slowdown in some of its downstream process instances. After detecting the issue and replicating the slow process instance, these downstream instances may start recovering while the parent process instance is also catching up. In practice, the affected downstream instances may not start recovering simultaneously but with a difference of a few minutes. It is possible to treat the process instances that are a bit late to recover as slow process instances when comparing them with their peers and thus replicate them. This may result in a large number of false positives that might overload the streaming system and in turn negatively impact overall performance. Thus, to reduce the number of false positives, another filter may be applied to the set of process instance candidates C. This filter may be applied by itself or in combination with the filter described above in Section B.

Figure 11:
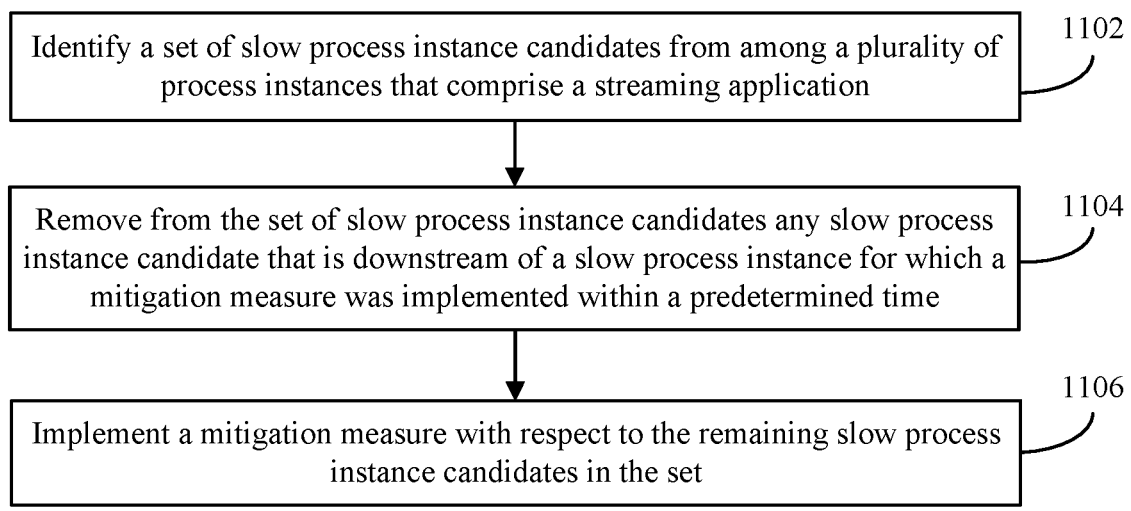
FIG. 11 depicts a flowchart of a method of mitigating a slow process instance after application of another filter, according to an embodiment.

FIG. 11 depicts a flowchart of a method of mitigating a slow process instance after application of another filter, according to an embodiment. FIG. 11 begins with step 1102, a set of slow process instance candidates is identified from among a plurality of process instances that comprise a streaming application. For example, and in reference to FIG. 3, slow instance identifier 302 may determine a set of slow process instance candidates C from among a plurality of process instances that comprise a streaming application. The identification of slow process instance candidates may be determined based on a watermark latency value, a relative watermark latency value, or a combination of both as described above.

In step 1104, any slow process instance candidate that is downstream of a slow process instance for which a mitigation measure was implemented within a predetermined time is removed from the set of slow process instance candidates. For example, and in reference to FIG. 3, second filter 306 may remove from the set of slow process instance candidates any slow process instance candidate that is downstream of a slow process instance for which a mitigation measure was implemented within a predetermined time. In an embodiment, second filter 306 may be utilized after first filter 304, thus both filters may be used to reduce the number of false positives. In other embodiments, either second filter 306 or first filter 304 may be used alone. The predetermined time is further described in conjunction with FIG. 12.

In step 1106, a mitigation measure with respect to the remaining slow process instance candidates in the set is implemented. For example, and in reference to FIG. 3, mitigation implementer 308 may implement a mitigation measure with respect to the remaining slow process instance candidates in the set. As described above, a mitigation measure for a slow instance may include replicating such a slow instance, although other mitigation measures may also be applied by mitigation implementer 308. As described above, a mitigation measure may depend on the issue that is impacting the latency. In embodiments, mitigation measures may include duplicating a slow process instance, utilizing a physical data center instead of a virtual machines or vice versa, avoiding slow nodes, limiting resources with thresholds to avoid overloading a streaming system, modifying a job graph of an application to promote efficient resource usage, etc.

In an example embodiment, every time a replica is created because a process instance is running slower than its peers, the time needed for the affected downstream process instances to recover such that no more slow process instances appear at the downstream stages may be denoted as stabilization time. The stabilization time is defined per downstream stage. Thus, if the slow instance appears at stage s, a separate stabilization time may be computed for each downstream stage, s', s⇒s'. In an embodiment, one stabilization may be applied across all stages of an application. In another embodiment, different stabilization times may be applied to different stages.

Figure 12:
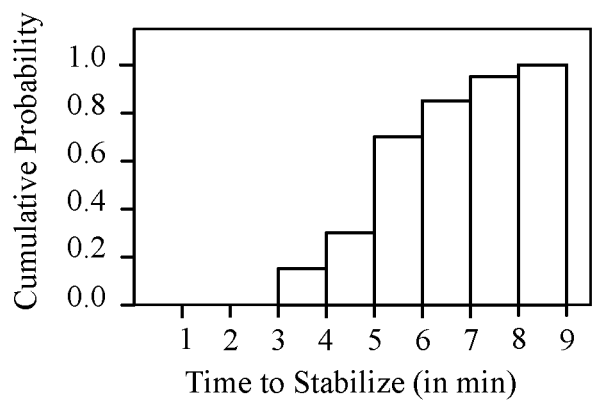
FIG. 12 is a bar graph that depicts a cumulative distribution of stabilization time, according to an embodiment.

In an example large-scale pipeline, a cumulative distribution function of the stabilization time across all downstream stages may be determined. FIG. 12 is a bar graph 1200 that depicts a cumulative distribution of stabilization time for a pipeline. As shown in graph 1200, it may take up to 8 minutes for the downstream stages to fully stabilize after a parent process instance is replicated.

After a replica is created for a given process instance, the job graph may be traversed (e.g., by second filter 306 of FIG. 3) to identify the downstream process instances affected by the given process instance. Filter 306 may remove the identified downstream process instances from the set of slow process instance candidates or not perform any action on the downstream process instances unless a specific time window, stabilization time $t_s$ has passed. Thus, the downstream process instances are allowed enough time to stabilize. In the algorithm described above, this filtering process is set forth in lines 10-14.

Referring back to FIG. 12, graph 1200 provides a range of values for determining how to set the value of $t_s$. Graph 1200 shows that after about 8 minutes, 100 percent of the impacted process instances of the example pipeline have stabilized. In practice, setting the stabilization time to the highest time shown in graph 1200 may lead to slightly higher tail latencies as it resembles more of a conservative approach that does not react fast enough to real outliers that might exist in these parts of the pipelines. A lower value, for example 4 minutes, may result in better tail latencies for a large-scale pipeline. Accordingly, the stabilization time may depend on the application of the streaming system and may be determined based on empirical data.

III. Example Computer System Implementation

Each of slow instance mitigator 116, slow instance mitigator 300, and slow instance identifier 400, and flowcharts 500, 800, 1000, and 1100 may be implemented in hardware, or hardware combined with software and/or firmware. For example, slow instance mitigator 116, slow instance mitigator 300, and slow instance identifier 400, and flowcharts 500, 800, 1000, and 1100 may be implemented as computer program code/instructions configured to be executed in one or more processors and stored in a computer readable storage medium. Alternatively, slow instance mitigator 116, slow instance mitigator 300, and slow instance identifier 400, and flowcharts 500, 800, 1000, and 1100 may be implemented as hardware logic/electrical circuitry.

For instance, in an embodiment, one or more, in any combination, of slow instance mitigator 116, slow instance mitigator 300, and slow instance identifier 400, and flowcharts 500, 800, 1000, and 1100 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 13:
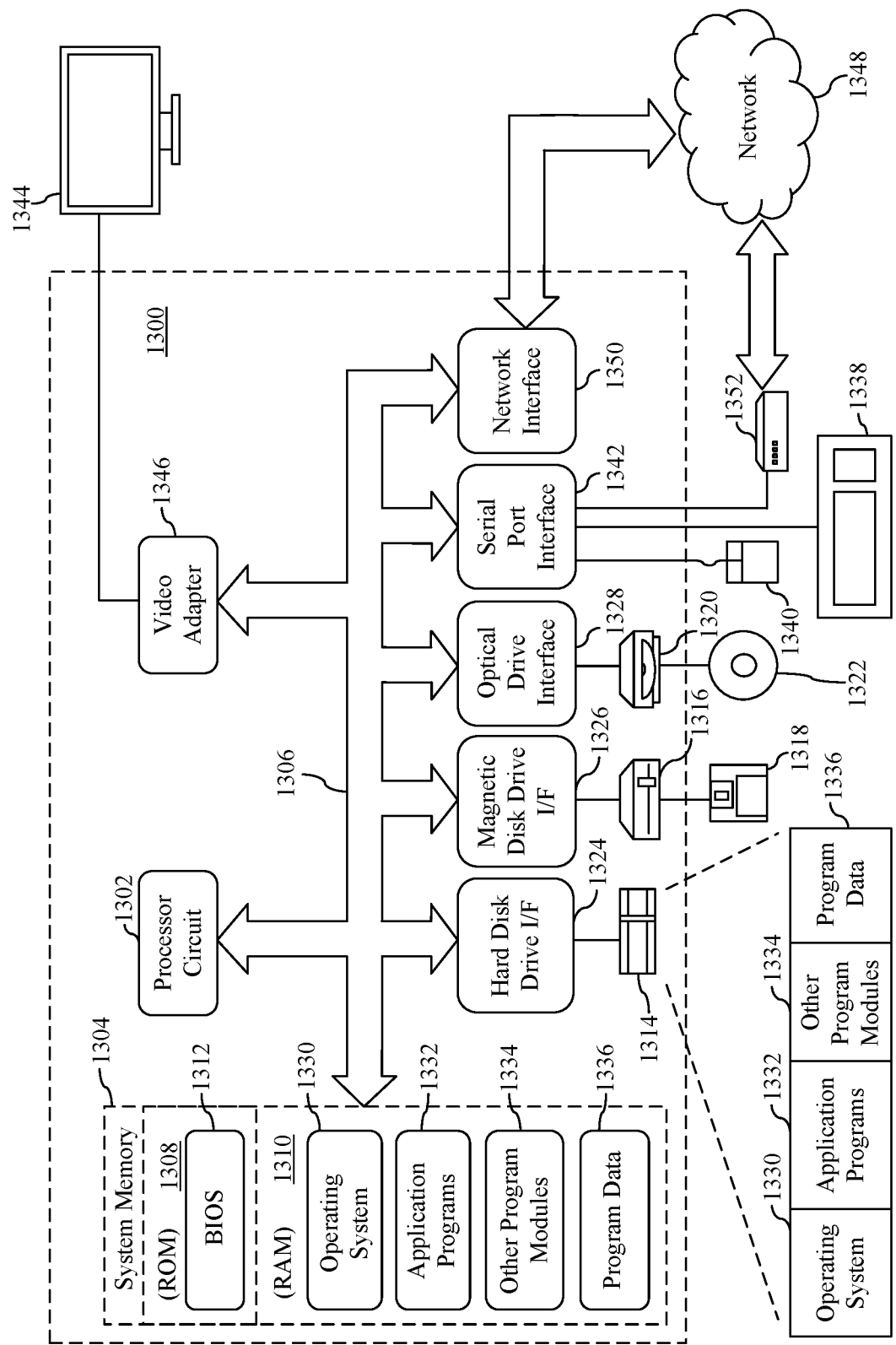
FIG. 13 is a block diagram of an example computer system in which embodiments may be implemented.

FIG. 13 depicts an exemplary implementation of a computing device 1300 in which embodiments may be implemented. For example, slow instance mitigator 116, slow instance mitigator 300, and slow instance identifier 400 may each be implemented in one or more computing devices similar to computing device 1300 in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing slow instance mitigator 116, slow instance mitigator 300, and slow instance identifier 400, and flowcharts 500, 800, 1000, and 1100 (including any suitable step of such flowcharts), and/or further embodiments described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments described herein. Accordingly, such computer programs represent controllers of the computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A system for identifying a set of slow process instance candidates from among a plurality of process instance candidates that comprise a streaming application is described herein. The system includes one or more processor circuits and one or more memory devices connected to the one or more processor circuits, the one or more memory devices storing computer program logic for execution by the one or more processor circuits. The computer program logic includes a watermark determiner configured to determine a first watermark of a first process instance, the first watermark representing an event time associated with a slowest input stream to the first process instance, identify a parent process instance of the first process instance, the parent process instance being included in a stage of the streaming application that precedes a stage that includes the first process instance and determine a parent watermark for the parent process instance, the parent watermark representing an event time associated with a slowest input stream to the parent process instance. The computer program logic further includes a latency generator configured to generate a first relative watermark latency value of the first process instance with respect to the parent process instance by determining a difference between the first watermark and the parent watermark and a slow process instance candidate identifier configured to identify the first process instance as a slow process instance candidate if the first relative watermark latency value is higher than a second relative watermark latency value of a second process instance, the second process instance being included in the same stage of the streaming application as the first process instance.

In an additional embodiment of the foregoing system, the watermark determiner is further configured to determine a third watermark of a third process instance; the latency generator is further configured to generate a relative watermark latency value for the third process instance with respect to each of a plurality of parent process instances each in a different preceding stage of the streaming application; and the slow instance candidate identifier is further configured to determine a combination value based on the relative watermark latency values for the third process instance, compare each relative watermark latency value of the third process instance to a sum of the combination value plus a threshold value; and identify the third process instance as a slow process instance candidate if each of the relative watermark latency values of the third process instance is greater than the combination value plus the threshold value.

In another embodiment of the foregoing system, the combination value comprises one of a mean, a median or an aggregate of the relative watermark latency values of the third process instance.

In an additional embodiment of the foregoing system, wherein the threshold value is a configurable number that corresponds to a degree of aggressiveness in identifying slow process instance candidates.

One embodiment of the foregoing system further comprises a filter configured to determine whether the slow process instance candidate in the set persists as a slow process instance candidate for a predetermined number of invocations of a mitigation policy; and based upon a determination that the slow process instance candidate in the set persists as a slow process instance candidate for the predetermined number of invocations of a mitigation policy, identify the slow process instance candidate as a slow process instance.

Another embodiment of the foregoing system further comprises a filter configured to remove from the set of slow process instance candidates any slow process instance candidate that is downstream of a slow process instance for which a mitigation measure was implemented within a predetermined time.

In another embodiment, the system further comprises a mitigation implementer configured to implement a mitigation measure with respect to remaining slow process instance candidates in the set.

In yet another embodiment, the mitigation measure comprises requesting a container to be launched for replicating each of the remaining slow process instance candidates in the set.

A computer-implemented method is described herein. The method comprises identifying a set of slow process instance candidates from among a plurality of process instances that comprise a streaming application; determining whether each slow process instance candidate in the set of slow process instance candidates persists as a slow process instance candidate for a predetermined number of invocations of a mitigation policy; identifying the slow process instance candidate as a slow process instance based upon a determination that a slow process instance candidate in the set of slow process instance candidates persists as a slow process instance candidate for the predetermined number of invocations of a mitigation policy; and implementing a mitigation measure with respect to the identified slow process instance.

In an additional embodiment of the foregoing method, one or more of the plurality of process instances is configured to perform a windowed operation on at least one input stream thereof, the windowed operation comprising a window length; and the predetermined number of mitigation policy invocations is independent of the window length.

In another embodiment of the foregoing method, identifying the set of slow process instance candidates comprises identifying the set based on a relative watermark latency of each of the slow process instance candidate of the set.

In yet another embodiment of the foregoing method, the mitigation policy is periodically invoked to determine a set of slow process instances and to request an appropriate mitigation measure for the determined set of slow process instances.

In an embodiment of the foregoing method, implementing the mitigation measure with respect to the identified slow process instance comprises requesting a container to be launched for replicating the identified slow process instance.

An additional embodiment of the foregoing method further comprises periodically backing up internal states of the plurality of process instances to facilitate selective relaunching of particular ones of the plurality of process instances of the streaming application.

Another system is also described herein. The system includes one or more processor circuits; and one or more memory devices connected to the one or more processor circuits, the one or more memory devices storing computer program logic for execution by the one or more processor circuits, the computer program logic including: a slow process instance candidate identifier configured to identify a set of slow process instance candidates from among a plurality of process instances that comprise a streaming application; a filter configured to remove from the set of slow process instance candidates any slow process instance candidate that is downstream of a slow process instance for which a mitigation measure was implemented within a predetermined time; and a mitigation implementer configured to implement a mitigation measure with respect to remaining slow process instance candidates in the set.

In another embodiment of the foregoing system, the slow process instance candidate identifier is configured to identify the set of slow process instance candidates based on a relative watermark latency of each of the slow process instance candidate of the set.

In yet another embodiment of the foregoing system, the mitigation measure comprises requesting a container to be launched for replicating each of the remaining slow process instance candidates in the set.

In an additional embodiment of the foregoing system, the mitigation implementer is further configured to periodically back up internal states of the plurality of process instances to facilitate selective relaunching of particular ones of the plurality of process instances of the streaming application.

In another embodiment of the foregoing system, the predetermined time is defined per downstream stage of the streaming application that comprises a removed slow process instance candidate.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
a processor circuit;
a memory device connected to the processor circuit, the memory device storing computer program logic for execution by the processor circuit, the computer program logic including:
a slow process instance candidate identifier that identifies a set of slow process instance candidates from among a plurality of process instances that comprise a streaming application;
a filter that:
determines whether each slow process instance candidate in the set of slow process instance candidates persists as a slow process instance candidate for a predetermined number of invocations of a mitigation policy; and
identifies the slow process instance candidate as a slow process instance based upon a determination that a slow process instance candidate in the set of slow process instance candidates persists as a slow process instance candidate for the predetermined number of invocations of a mitigation policy; and
a mitigation implementer that implements a mitigation measure with respect to the identified slow process instance.

2. The system of claim 1, wherein a process instance of the plurality of process instances performs a windowed operation on an input stream thereof, the windowed operation comprising a window length; and
wherein the predetermined number of mitigation policy invocations is independent of the window length.

3. The system of claim 1, wherein the slow process instance candidate identifier identifies the set of slow process instance candidates based on a relative watermark latency of each of the slow process instance candidates of the set.

4. The system of claim 1, wherein the mitigation policy is periodically invoked to determine a set of slow process instances and to request an appropriate mitigation measure for the determined set of slow process instances.

5. The system of claim 1, wherein the mitigation implementer implements the mitigation measure with respect to the identified slow process instance by requesting a container to be launched for replicating the identified slow process instance.

6. The system of claim 1, wherein the mitigation implementer periodically performs a back up of internal states of the plurality of process instances to facilitate selective relaunching of particular ones of the plurality of process instances of the streaming application.

7. The system of claim 1, wherein the slow process instance candidate identifier identifies the set of slow process instance candidates based on a latency value associated with a respective watermark of each of the slow process instance candidates.

8. The system of claim 7, wherein the watermark of each of the slow process instance candidates represents an event time associated with a slowest input stream to the slow process instance candidate.

9. A computer-implemented method, comprising:
identifying a set of slow process instance candidates from among a plurality of process instances that comprise a streaming application;
determining whether each slow process instance candidate in the set of slow process instance candidates persists as a slow process instance candidate for a predetermined number of invocations of a mitigation policy;
identifying the slow process instance candidate as a slow process instance based upon a determination that a slow process instance candidate in the set of slow process instance candidates persists as a slow process instance candidate for the predetermined number of invocations of a mitigation policy; and
implementing a mitigation measure with respect to the identified slow process instance.

10. The computer-implemented method of claim 9, wherein a process instance of the plurality of process instances performs a windowed operation on an input stream thereof, the windowed operation comprising a window length; and
wherein the predetermined number of mitigation policy invocations is independent of the window length.

11. The computer-implemented method of claim 9, wherein identifying the set of slow process instance candidates comprises identifying the set based on a relative watermark latency of each of the slow process instance candidates of the set.

12. The computer-implemented method of claim 9, wherein the mitigation policy is periodically invoked to determine a set of slow process instances and to request an appropriate mitigation measure for the determined set of slow process instances.

13. The computer-implemented method of claim 9, wherein implementing the mitigation measure with respect to the identified slow process instance comprises requesting a container to be launched for replicating the identified slow process instance.

14. The computer-implemented method of claim 9, further comprising:
periodically backing up internal states of the plurality of process instances to facilitate selective relaunching of particular ones of the plurality of process instances of the streaming application.

15. The computer implemented method of claim 9, wherein the identification of the set of slow process instance candidates is based on a latency value associated with a respective watermark of each of the slow process instance candidates, and wherein the watermark of each of the slow process instance candidates represents an event time associated with a slowest input stream to the slow process instance candidate.

16. A system, comprising:
a processor circuit;
a memory device connected to the processor circuit, the memory device storing computer program logic for execution by the processor circuit, the computer program logic including:
a slow process instance candidate identifier that identifies a set of slow process instance candidates from among a plurality of process instances that comprise a streaming application with multiple stages;
a filter that removes from the set of slow process instance candidates any slow process instance candidate that is downstream within the streaming application with multiple stages of a slow process instance for which a mitigation measure was implemented within a predetermined time; and
a mitigation implementer that implements a mitigation measure with respect to remaining slow process instance candidates in the set.

17. The system of claim 16, wherein the slow process instance candidate identifier identifies the set of slow process instance candidates based on a relative watermark latency of each of the slow process instance candidates of the set.

18. The system of claim 16, wherein the mitigation measure comprises requesting a container to be launched for replicating each of the remaining slow process instance candidates in the set.

19. The system of claim 16, wherein the mitigation implementer periodically performs a back up of internal states of the plurality of process instances to facilitate selective relaunching of particular ones of the plurality of process instances of the streaming application.

20. The system of claim 16, wherein the predetermined time is defined per downstream stage of the streaming application that comprises a removed slow process instance candidate.

\* \* \* \* \*